United States Patent [19]

Zeitlin et al.

[11] B 4,007,290
[45] Feb. 8, 1977

[54] CAFFEINE ANTAGONIM

[75] Inventors: Benjamin Raphael Zeitlin, Suffern; Alan Bryan Pritchard, Hartsdale, both of N.Y.; Harold S. Levenson, Stamford, Conn.

[73] Assignee: General Foods Corporation, White Plains, N.Y.

[22] Filed: Jan. 9, 1974

[21] Appl. No.: 431,797

[44] Published under the second Trial Voluntary Protest Program on March 30, 1976 as document No. B 431,797.

[52] U.S. Cl. .................................. 426/594; 426/72; 426/595
[51] Int. Cl.$^2$ .................. A23F 1/04; A23F 1/10
[58] Field of Search ............ 426/190, 311, 72, 193, 426/147, 354, 594, 595; 260/295

[56] References Cited

UNITED STATES PATENTS

| | | | |
|---|---|---|---|
| 2,206,319 | 7/1940 | Geitz, Jr. | 426/311 X |
| 2,340,989 | 2/1944 | Salkin | 426/311 X |
| 2,380,092 | 7/1945 | Weisberg | 429/594 |
| 3,243,347 | 3/1966 | Kracauer | 426/311 X |
| 3,536,494 | 10/1970 | Johnson | 426/311 |
| 3,579,356 | 5/1971 | Miller et al. | 426/177 |

FOREIGN PATENTS OR APPLICATIONS 190,944   7/1957   Germany

OTHER PUBLICATIONS

"Coffee User's Guide," by M. Sivetz, published by Coffee Publications, Box 455, San Anselmo, Cal., 1963, p. 21.
"Fortification of Foods with Vitamins and Minerals," by A. F. Morgan in Milbank Memorial Fund Quarterly, 1939, vol. 17, pp. 221–229.
"Modern Drug Encyclopedia," edited by M. Howard, Fourth Edition, Published by Drug Publications Inc., N.Y. 1949.
S. Bellet et al., "The Effect of Nicotinic Acid on the Caffeine Induced Serum Free Fatty Acid Increase," The Journal of Pharmacology and Experimental Therapeutics, vol. 175, pp. 348–351.
"Determination of Nicotinic Acid in Coffee by Paper Chromatography," by Boddeker et al., Analytical Chemistry, vol. 35, No. 11, Oct. 1963, pp. 1662–1663.

*Primary Examiner*—Frank W. Lutter
*Assistant Examiner*—N. Greenblum
*Attorney, Agent, or Firm*—Thaddius J. Carvis; Daniel J. Donovan

[57] ABSTRACT

Disclosed are a method and composition for controlling the sleep disturbing characteristics of caffeine-containing beverages which avoid the need for removing the caffeine. This is accomplished by including nicotinic acid or a soluble salt thereof in the beverage in an amount which is greater than that naturally present and which is effective to antagonize the sleep disturbing characteristics of the caffeine in the beverage.

14 Claims, No Drawings

CAFFEINE ANTAGONIM

BACKGROUND OF THE INVENTION

The invention relates to caffeine-containing beverages, and, more particularly, to the discovery of an improved manner of controlling the stimulating effects, and specifically, the sleep disturbing effects of caffeine-containing beverages such as coffee and tea.

Certain beverages are known to contain significant amounts of caffeine. The stimulating effects of caffeine, especially when derived from pleasing beverages such as coffee and tea, are highly desired.

There are, however, people who enjoy the flavor and aroma of freshly brewed coffee and tea, but who, especially in the evening, find that the desirable stimulatory effects of such beverages have, for them, the undesirable result of sleep disturbance. Endeavoring to satisfy the needs and desires of this segment of the population, the coffee industry has developed a variety of processes for producing decaffeinated products, which today enjoy a large market.

Experience has shown, however, that in gaining the advantages of decaffeination using current technology, some quality loss and increased costs occur. This is true of even the best commercial procedures. Decaffeination of coffee can be accomplished by solvent extraction of the caffeine from green coffee or roasted coffee extract using chlorinated hydrocarbon solvents. Water extraction of green beans by means of a caffeine-free water extract is also a well known commercial system. These processes require the presence of water and extended processing times and heating — all detrimental to the flavor and, particularly, the aroma of the finished product. In addition, the processing conditions may cause losses of some materials other than caffeine from the product, resulting in at least an economic loss. Moreover, equipment for carrying out these processes, avoiding solvent loss, and controlling solvent residues is expensive.

SUMMARY OF THE INVENTION

In view of the difficulties encountered in controlling the sleep disturbing properties of caffeine-containing beverages by removing the caffeine, it is an object of the present invention to find an alternative manner for attaining this end.

It is another object of the present invention to obtain the benefits of decaffeination, specifically the sleep permitting benefit, without the quality loss and costs associated with conventional decaffeinated products.

It is a further object of the present invention to provide a method and a composition whereby the sleep disturbing characteristics of caffeine-containing beverages can be controlled by directly antagonizing the effects of, without need for removing, the caffeine.

It is a yet further object of the present invention to provide a good tasting coffee beverage which has diminished sleep disturbing properties.

It is still another object of the present invention to, in a simple and inexpensive manner, extend benefits of decaffeination to all caffeine-containing beverages, including coffee, tea and cola beverages, with no solvent risks while allowing for a controlled degree of reduction in the sleep disturbing effects of caffeine.

These and other objects are accomplished according to the present invention which provides a method and composition for controlling the sleep disturbing characteristics of caffeine-containing beverages, without removal of the caffeine, by including nicotinic acid or a soluble salt thereof in the beverage or beverage source in an amount greater than that naturally present and which is effective to at least partially antagonize the sleep disturbing characteristics of the beverage.

DETAILED DESCRIPTION

The present invention is based upon the discovery that the sleep disturbing characteristics of caffeine-containing beverages, such as tea and coffee, can be controlled by employing an effective amount of nicotinic acid as a caffeine antagonist in the beverage.

The nicotinic acid or one of its soluble salts is employed in the caffeine-containing beverage or beverage source in an amount effective to at least partially antagonize the sleep disturbing characteristics of the beverage. For the purposes of the present invention, a beverage source is defined as any material which can be dissolved in or extracted with water or aqueous liquid to produce a beverage. Included as beverage sources are roasted and ground coffee, soluble coffee, tea leaves, soluble tea, cola beverage concentrates, and the like. Among the suitable soluble salts of nicotinic acid are the sodium, potassium and calcium salts.

The nicotinic acid can be formulated in the beverage or beverage source in any suitable manner. Thus, the nicotinic acid can be added directly, as part of some other beverage ingredient, or as a separate additive.

It is noted that nicotinic acid, now identified as a caffeine antagonist according to the present invention, is naturally present in certain caffeine-containing beverages in minor amounts. It is presently believed that, while no one has heretofore recognized the effect, the nicotinic acid naturally present in coffee and tea actually exerts an antagonism toward the sleep disturbing properties of the caffeine also present therein. With coffee, tea and other caffeine-containing beverages containing natural nicotinic acid, it is the total amount of antagonist present, from whatever source derived, which antagonizes the sleep disturbing effect of caffeine. It is contemplated to include within the scope of the invention any amount of nicotinic acid, above that naturally present in the particular caffeine-containing beverage, which is effective to at least partially antagonize the sleep disturbing characteristics of caffeine. It is not essential to the present invention to completely eliminate the sleep disturbing characteristics of caffeine.

Coffee beverages are prepared in varying strengths from coffees of varying degrees of roasts and with varying types of additives as a matter of tradition, local custom and individual taste. As prepared in the United States a 5-½ ounce cup of coffee is typically an aqueous coffee solution containing from about 0.75 gram to about 3.5 grams of soluble coffee solids. As a matter of convenience in definition, and to provide a point of reference, it will be considered that a cup of coffee contains from about 1.5 grams to 2.0 grams of soluble coffee solids.

Similarly, because it is known that nicotinic acid is produced during the coffee roasting process by the demethylation of trigonelline, the degree of roast can be conveniently and precisely defined in terms of the natural nicotinic acid content after roasting. Green coffee contains less than about 0.2 mg of nicotinic acid per 10 grams of coffee, and the darkest roast coffees contain less than 5 mg per 10 grams of coffee. Medium roasts contain from about 0.8 mg to 1.5 mg of natural nicotinic acid per 10 grams of coffee, and are so defined for the purposes of the present invention.

Nicotinic acid is effective in small amounts, and, can be employed in the beverage in any effective amount greater than the amount naturally present. The beverage can contain its full natural complement of caffeine or be partially decaffeinated.

According to a preferred embodiment of the present invention, nicotinic acid is employed in coffee in an amount greater than the amount naturally present, which is effective to at least partially antagonize the sleep disturbing characteristics of the caffeine. Thus, for a medium roast coffee the nicotinic acid will be employed at a level sufficient to provide greater than 1.5 mg per cup of coffee beverage as previously defined. Preferably, the nicotinic acid is employed at a level sufficient to provide from greater than 3 mg to 120 mg per cup, and more preferably, from about 6 mg to 50 mg per cup of coffee beverage. The most preferred levels, based on a balance of effectiveness and projected commerical acceptance, are those sufficient to provide nicotinic acid in an amount within the range of from about 10 mg to 30 mg per cup. The lower levels of nicotinic acid are most preferred in partially decaffeinated coffee or where a reduced antagonism is desired.

While it is an objective of the invention to totally eliminate the need for decaffeination, it is within the scope of the invention to partially decaffeinate a beverage product such as coffee and then add an amount of nicotinic acid which is effective to antagonize the sleep disturbing effects of the caffeine remaining in the beverage.

By employing an amount of nicotinic acid in a partially decaffeinated product or in a blend of regular and decaffeinated coffees, it is possible to obtain certain desirable effects of decaffeination while avoiding certain undesirable effects. For example, a good blend of coffees might contain a portion of a relatively economical, low quality coffee such as robusta and a portion of a more expensive, high quality coffee such as Colombian. Conventionally, in preparing a decaffeinated coffee product from this blend, the entire blend would be subjected to solvent or water decaffeination. This procedure does not greatly adversely affect the robusta coffee because in addition to removing the caffeine it likewise removes some of the harsher notes from the coffee. However, it is generally considered that this procedure destroys many of the good qualities of the milder, Colombian coffee. According to the present invention, a coffee product can be prepared by solvent or preferably water decaffeinating a robusta coffee, where flavor destruction would be minimal, and blending this with non-decaffeinated Colombian coffee and an amount of nicotinic acid effective to at least partially antagonize the caffeine in the blend.

In like manner with coffee, nicotinic acid is added to tea to reduce or antagonize its sleep disturbing effects. Typically in the United States, tea is brewed to a strength which results in a caffeine content of about one third to one half that of coffee. Accordingly, when adding the nicotinic acid to tea, the amount should be reduced to about one third to about one half of that employed for an equal amount of coffee to obtain a corresponding degree of caffeine antagonism.

The desirable features of the present invention can also be utilized in beverages wherein caffeine is added for flavoring or other purposes, but where the sleep disturbing characteristics are not desired. For example, caffeine is added to cola flavored soft drinks to enhance their acceptance. By adding an effective amount of a caffeine antagonist according to the present invention, the undesirable sleep disturbing characteristics of the caffeine can be antagonized.

The following examples are presented for the purpose of further illustrating and explaining the present invention and are not to be taken as limiting in any sense. Unless otherwise indicated, all parts and percentages are by weight.

EXAMPLE I

Green coffee beans are subjected to a conventional roasting procedure to obtain a medium roast. The roasted beans have a natural nicotinic acid content of about 1.0 mg per 10 grams. While still warm, an aqueous solution of nicotinic acid is sprayed onto the beans in an inert nitrogen atmosphere. The warm, but cooling beans absorb at least a portion of the solution. The cooled beans contain 25 mg of nicotinic acid per 10 grams total weight. The beans are then ground in conventional manner for brewing with hot water to make a coffee beverage wherein the sleep disturbing characteristics of the caffeine are antagonized.

EXAMPLE II

The procedure of Example I is repreated but this time cooling the beans before application of the nicotinic acid solution, and then drying the beans in a vacuum dryer.

EXAMPLE III

A first coffee extract is formed in a commercial percolation process (about 38 percent yield of soluble solids based on the weight of the roasted coffee) from water decaffeinated robusta coffee. A second extract is formed in similar manner for non-decaffeinated Colombian coffee. A combined extract is prepared by blending 75 parts of the first extract with 25 parts of the second extract and nicotinic acid in an amount equal to 60 mg for each 10 grams of the Colombian coffee beans employed in preparing the second extract. The combined extract is spray dried in conventional manner to yield soluble coffee solids. Dissolved in water, these solids provide a good tasting cup of coffee having diminished sleep disturbing potential.

EXAMPLE IV

The procedure of Example III is again repeated but this time the product is freeze dried.

EXAMPLE V

Nicotinic acid (200 mg) mg) is dissolved in 8 ounces of a commercial, non-dairy coffee lightener. About one ounce of the coffee lightener is then added to a cup of tea prepared by pouring 6 ounces of boiling water into a cup and steeping 1 bag of commercially available tea for two minutes with gentle agitation. The lightened tea contains just above 25 mg of nicotinic acid to antagonize the sleep interrupting properties of the caffeine in the tea.

EXAMPLE VI

Tablets are prepared by co-grinding 5 parts of L-aspartyl-L-phenylalanine methyl ester with 1 part of nicotinic acid and 94 parts of sucrose, and compressing one gram portions of this mixture. One tablet is dropped into a cup of tea prepared as above to yield a sweetened, low-calorie tea drink wherein the sleep interrupting effect of caffeine is significantly antagonized.

What is claimed is:

1. A composition for preparing a coffee beverage comprising (a) coffee containing caffeine, said coffee being selected from the group consisting of roasted and ground coffee and soluble coffee solids from roasted coffee, and (b) nicotinic acid or a soluble salt thereof, the amount of nicotinic acid or soluble salt thereof being sufficient to provide from about 6 mg to about 50 mg per cup of coffee beverage prepared from said coffee, wherein a cup of coffee beverage comprises an aqueous solution containing from about 1.5 to 2.0 grams of soluble coffee solids, and the amount of nicotinic acid or soluble salt thereof present in the coffee beverage is effective to at least partially antagonize the sleep disturbing characterictics of the caffeine present in the coffee.

2. A composition according to claim 1 wherein the coffee is roasted and ground coffee.

3. A composition according to claim 1 wherein the coffee is partially decaffeinated.

4. A composition according to claim 1 wherein the coffee is a medium roast coffee.

5. A composition according to claim 4 wherein the nicotinic acid or soluble salt thereof is present in an amount sufficient to provide from about 10 mg to 30 mg per cup of coffee beverage.

6. A composition according to claim 1 wherein the coffee is soluble coffee.

7. A composition according to claim 6 wherein the soluble coffee is partially decaffeinated.

8. A composition according to claim 6 wherein the soluble coffee is a blend of a decaffeinated coffee with a non-decaffeinated coffee.

9. A composition according to claim 6 wherein the nicotinic acid or soluble salt thereof is present in an amount sufficient to provide from about 10 mg to about 30 mg per cup of coffee beverage.

10. A composition according to claim 6 wherein the soluble coffee is a medium roast coffee.

11. A composition according to claim 10 wherein the nicotinic acid or soluble salt thereof is present in an amount sufficient to provide from about 10 mg to about 30 mg per cup of coffee beverage.

12. A method for controlling the sleep disturbing characteristics of caffeine-containing coffee, said coffee being selected from the group consisting of roasted and ground coffee and soluble coffee solids from roasted coffee, which method comprises incorporating into the coffee nicotinic acid or a soluble salt thereof at a level sufficient to supply from about 6 mg to about 50 mg per cup of coffee beverage prepared from said coffee, wherein a cup of coffee comprises an aqueous solution containing from about 1.5 to 2.0 grams of soluble coffee solids, and the amount of nicotinic acid of soluble salt thereof present in the coffee beverage is effective to at least partially antagonize the sleep disturbing characteristics of the caffeine present in the coffee.

13. A method according to claim 12 wherein the nicotinic acid or soluble salt thereof is incorporated into the coffee by applying it to roast and ground coffee before brewing.

14. A method according to claim 12 wherein the nicotinic acid or soluble salt thereof is incorporated into the coffee by adding it to a coffee extract and drying the extract to form a soluble coffee product.

* * * * *

UNITED STATES PATENT AND TRADEMARK OFFICE
CERTIFICATE OF CORRECTION

PATENT NO. : 4,007,290
DATED : February 8, 1977
INVENTOR(S) : Benjamin Raphael Zeitlin et al.

It is certified that error appears in the above-identified patent and that said Letters Patent are hereby corrected as shown below:

On the cover page and in column 1, in the title of the patent, change "ANTAGONIM" to -- ANTAGONISM -- .

In column 4, line 1 of Example V, delete "mg)" (second occurrence).

*Signed and Sealed this*

*fifth* Day of *July 1977*

[SEAL]

Attest:

RUTH C. MASON
*Attesting Officer*

C. MARSHALL DANN
*Commissioner of Patents and Trademarks*